(12) United States Patent
Chen et al.

(10) Patent No.: US 11,509,868 B2
(45) Date of Patent: Nov. 22, 2022

(54) METHOD AND APPARATUS FOR FAILOVER IN A VIDEO SURVEILLANCE SYSTEM

(71) Applicant: EMC IP Holding Company LLC, Hopkinton, MA (US)

(72) Inventors: Kenny Chen, Shanghai (CN); Bo Huang, Shanghai (CN); Carl Shi, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 922 days.

(21) Appl. No.: 15/709,591

(22) Filed: Sep. 20, 2017

(65) Prior Publication Data

US 2018/0091778 A1 Mar. 29, 2018

(30) Foreign Application Priority Data

Sep. 23, 2016 (CN) .......................... 201610847715.X

(51) Int. Cl.
*H04N 7/18* (2006.01)
*G06F 9/455* (2018.01)
(Continued)

(52) U.S. Cl.
CPC ......... *H04N 7/181* (2013.01); *G06F 9/45558* (2013.01); *H04L 69/40* (2013.01); *G06F 2009/45579* (2013.01); *G06V 20/52* (2022.01)

(58) Field of Classification Search
CPC ................. H04N 7/181; G06F 9/45558; G06F 2009/45579; H04L 69/40; G06K 9/00771
(Continued)

(56) References Cited

U.S. PATENT DOCUMENTS 8,180,742 B2   5/2012   Claudatos et al.
8,180,743 B2   5/2012   Claudatos et al.
(Continued)

FOREIGN PATENT DOCUMENTS

CN   1917634     2/2007
CN   101652999   2/2010
(Continued)

OTHER PUBLICATIONS

Chinese Office Action (with English translation) issued by The Patent Office of the People's Republic of China dated Sep. 23, 2019, for Chinese Application No. 201610847715.X, Filing Date: Sep. 23, 2016, entitled "Method and Apparatus for Failover in a Video Surveillance System", 16 pages.

*Primary Examiner* — Behrooz M Senfi
(74) *Attorney, Agent, or Firm* — BainwoodHuang

(57) ABSTRACT

Implementations of the present disclosure provide a method and apparatus for failover in a video surveillance system. The video surveillance system includes a plurality of cameras hosted by a plurality of machines. At a first machine, a message indicating that a second machine has failure is received, the first machine and the second machine hosting a first set of cameras and a second set of cameras among the plurality of cameras, respectively; available resources of the first machine and loads of the first and second machines are determined; based on the available resources and the loads, parameters of at least one set of the first and second sets of cameras are configured, to enable the second set of cameras to be taken over by the first machine.

20 Claims, 3 Drawing Sheets

(51) Int. Cl.
*H04L 69/40* (2022.01)
*G06V 20/52* (2022.01)

(58) Field of Classification Search
USPC .......................................................... 348/159
See application file for complete search history.

(56) References Cited

U.S. PATENT DOCUMENTS

| | | | |
|---|---|---|---|
| 8,229,904 | B2 | 7/2012 | Claudatos et al. |
| 9,189,495 | B1 | 11/2015 | Hughes et al. |
| 9,268,780 | B2 | 2/2016 | Claudatos et al. |
| 9,405,634 | B1 | 8/2016 | Ambastha et al. |
| 9,904,482 | B1 | 2/2018 | Chakraborty et al. |
| 10,078,583 | B1 | 9/2018 | Wallace |
| 10,235,285 | B1 | 3/2019 | Wallace |
| 10,296,594 | B1 | 5/2019 | Datta |
| 2006/0136575 | A1* | 6/2006 | Payne ................ G07C 9/00087 |
| | | | 709/219 |
| 2006/0204229 | A1 | 9/2006 | Onodera |
| 2011/0069170 | A1* | 3/2011 | Emoto ............. G08B 13/19645 |
| | | | 348/148 |
| 2012/0093847 | A1* | 4/2012 | Baudoux ............. A61K 39/155 |
| | | | 424/186.1 |
| 2015/0113172 | A1* | 4/2015 | Johnson .................. H04L 67/34 |
| | | | 709/245 |
| 2015/0138365 | A1 | 5/2015 | Hsieh et al. |
| 2016/0142666 | A1 | 5/2016 | Chung et al. |
| 2018/0054476 | A1* | 2/2018 | Kyser .................. A61B 5/0013 |
| 2019/0273837 | A1* | 9/2019 | Townsend ............ H04N 1/2108 |

FOREIGN PATENT DOCUMENTS

| | | |
|---|---|---|
| CN | 101720035 A | 6/2010 |
| CN | 101873424 | 10/2010 |
| CN | 101873462 | 10/2010 |
| CN | 201689547 | 12/2010 |
| CN | 102075369 | 5/2011 |
| CN | 102227131 | 10/2011 |
| CN | 102968360 | 3/2013 |
| CN | 102984501 A | 3/2013 |
| CN | 103081408 | 5/2013 |
| CN | 103167268 | 6/2013 |
| CN | 104536372 | 4/2015 |
| CN | 104702906 | 6/2015 |
| CN | 105141456 A | 12/2015 |
| CN | 105430327 | 3/2016 |
| JP | 2014017545 A | 1/2014 |

\* cited by examiner

METHOD AND APPARATUS FOR FAILOVER IN A VIDEO SURVEILLANCE SYSTEM

RELATED APPLICATIONS

This application claim priority from Chinese Patent Application Number CN201610847715.X, filed on Sep. 23, 2016 at the State Intellectual Property Office, China, titled "METHOD AND APPARATUS FOR FAILOVER IN VIDEO SURVEILLANCE" the contents of which is herein incorporated by reference in its entirety.

FIELD

Implementations of the present disclosure generally relate to a video surveillance system, and more specifically, to a method and apparatus for failover in a video surveillance system.

BACKGROUND

Currently, with the growing demand for security surveillance, video surveillance systems have an expanding market. With large-scale deployment of video surveillance systems, it is desired that a more reliable video surveillance system can be obtained at a lower cost. A conventional video surveillance system includes cameras, a video management system server, and a storage server. In the process of deploying a video surveillance system, it is necessary not only to consider the scope of surveillance coverage and failover capability but also to take costs of deploying physical devices, such as cameras, video management system servers, and storage servers, into account.

SUMMARY

Implementations of the subject matter described herein provide a method and an apparatus for failover in a video surveillance system.

According to the first aspect of the subject matter described herein, there is provided a failover method in a video surveillance system. The video surveillance system includes a plurality of cameras hosted by a plurality of machines. The method includes: receiving, at a first machine, a message indicating that a second machine has a failure, the first and second machines hosting a first set of cameras and a second set of cameras among the plurality of cameras, respectively; determining available resources of the first machine and loads of the first and second machine; configuring, based on the available resources and the loads, parameters of at least one set of the first and second sets of cameras to enable the first machine to take over the second set of cameras.

According to the second aspect of the subject matter described herein, there is provided a failover apparatus in a video surveillance system. The video surveillance system includes a plurality of cameras hosted by a plurality of machines. The apparatus includes a message receiving module and a control module. The message receiving module is configured to receive, at the first machine, a message indicating that the second machine has a failure, the first and second machines hosting the first set and second set of cameras among a plurality of cameras, respectively. The control module is configured to: determine available resources of the first machine and loads of the first and second machines; configure, based on the available resources and the loads, parameters of at least one set of the first and second sets of cameras to enable the first machine to take over the second set of cameras.

BRIEF DESCRIPTION OF THE DRAWINGS

Through the following detailed description with reference to accompanying drawings, the above and other objectives, features, and advantages of example implementations of the present disclosure will become more apparent. In example implementations of the subject matter described herein, the same reference signs usually represent the same components.

DETAILED DESCRIPTION OF IMPLEMENTATIONS

Figure 1:
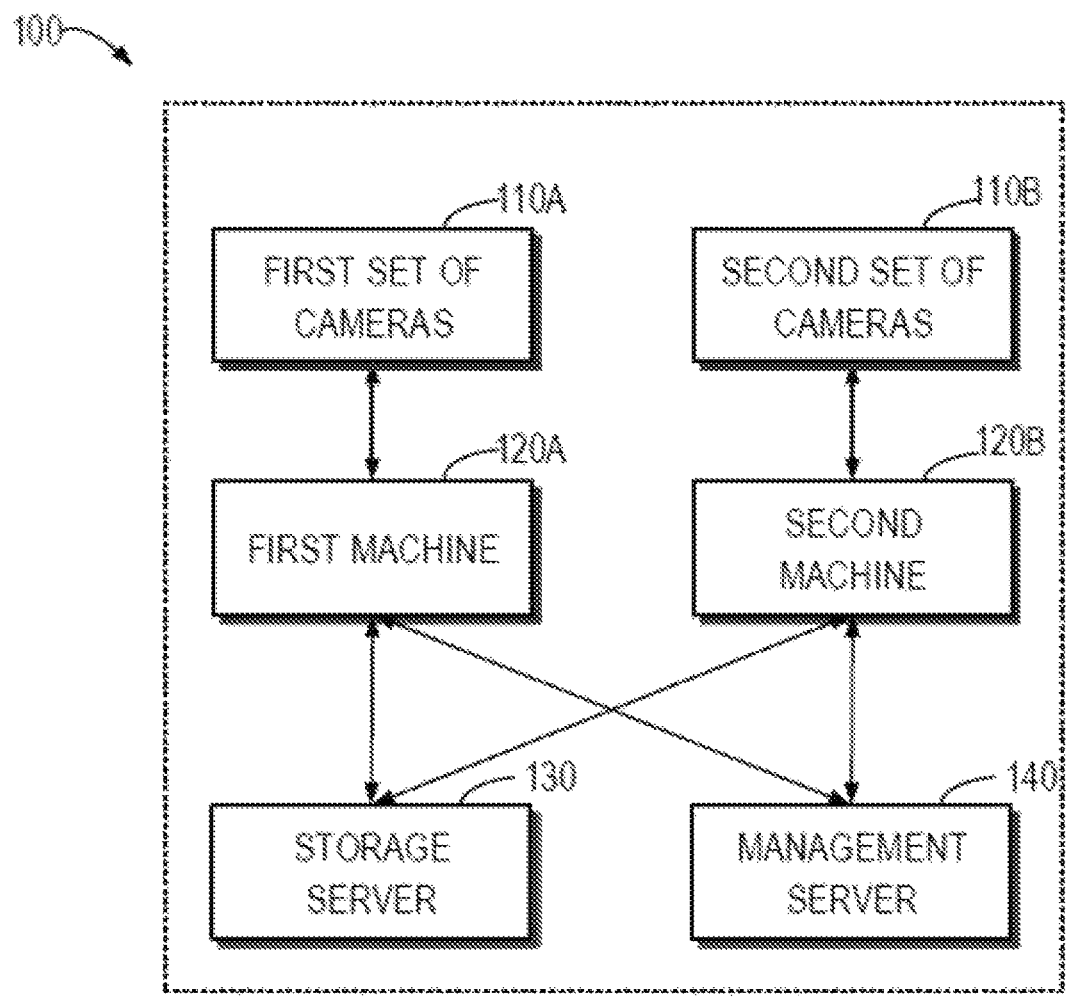
FIG. 1 is a block diagram illustrating a video surveillance system according to an implementation of the subject matter described herein.

Preferred implementations of the subject matter described herein will be described in the following text in greater detail with reference to the drawings. Although preferred implementations of the subject matter described herein are displayed in the drawings, it should be understood that the subject matter described herein can be implemented in various manners, not limited to the implementations illustrated herein. On the contrary, these implementations are provided to make the subject matter described herein clearer and more complete and convey the scope of the subject matter described herein completely to those skilled in the art.

As used herein, the term "includes" and its variants are to be read as open-ended terms that mean "includes, but not limited to." The term "or" is to be read as "and/or," unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first," "a second," and others can denote different or identical objects. The following text may also contain other explicit or implicit definitions.

As described above, a conventional video surveillance system includes cameras, a video management system server, and a storage server. Cameras are used to collect video data in real time at different surveillance spots. Video management systems are installed in certain physical machines. The physical machines are usually video management system servers. Video management system software obtains video streams from cameras and stores them in a storage server.

When a physical machine installed with the video management software has a failure, video streams collected by cameras hosted by the physical machine need to be transferred to another physical server. By means of arranging redundant servers or standby servers, it can be ensured that, upon occurrence of failure, video streams collected by cameras are stored effectively. With the large-scale deployment of video surveillance systems, it is desired that a more reliable video surveillance system can be obtained at a lower cost. In the process of deploying a video surveillance system, under consideration of the scope of surveillance coverage and failover capability, redundant servers or standby servers should be arranged, which, however, would increase costs of the system significantly.

To solve the above and other potential problems at least in part, implementations of the subject matter described herein provide a method and an apparatus for failover in a video surveillance system. According to the implementations of the subject matter described herein, when a machine (a virtual machine and/or a physical machine) hosting a set of cameras has a failure, a machine originally hosting another set of cameras can adjust parameters of the two sets of cameras based on current loads and conditions of available resources, thereby switching cameras hosted by the failed machine to another machine in a most appropriate manner.

FIG. 1 illustrates a video surveillance system 100 according to an implementation of the subject matter described herein. The video surveillance system 100 includes at least one camera and at least one machine. Now, description will be made with an example that the at least one camera comprises a first set of cameras 110A and a second set of cameras 110B, and that the at least one machine comprises a first machine 120A and a second machine 120B, where the first set of cameras 110A are hosted by the first machine 120A and the second set of cameras 110B are hosted by the second machine 120B. It should be noted that the term "camera" used herein includes any proper devices that can capture, process, and/or record videos and/or images. Each of the first set of cameras 110A and the second set of cameras 110B may include one or more cameras.

The video surveillance system 100 can be a closed circuit television CCTV surveillance system or an IP surveillance system. The first set of cameras 110A and the first machine 120A as well as the second set of cameras 110B and the second machine 120B can be in wired or wireless connections. The first set of cameras 110A and the second set of cameras 110B can be gun-type cameras, ball-type cameras and so on. The first set of cameras 110A and the second set of cameras 110B can support monochrome videos or color videos. The first set of cameras 110A and the second set of cameras 110B may be provided with a pan-tilt, a fill light, a rain cover, a dustproof glass enclosure, and the like. The first set of cameras 110A and the second set of cameras 110B may also support the functionality of infrared night vision.

In some implementations, the video surveillance system 100 may further include a storage server 130 into which at least one of the first machine 120A and the second machine 120B is mounted. The storage server 130 includes a storage array and a storage controller. The storage array generally refers to a hard disk array. The storage controller may include a processor and peripheral devices. For the storage server 130, generally, resources are not fully occupied by storage functions. Then, the rest of the resources can be used to support creating some virtual machines in the storage server 130.

By mounting a virtual machine in the storage server 130 and mounting video management system software in the virtual machine, physical servers specifically used for mounting video management software can be spared, thereby saving costs. The storage server 130 may include a single controller or multiple controllers. Correspondingly, the number of virtual machines can be determined depending on the number of controllers. Definitely, this is non-limiting and it is possible to combine any method or apparatus utilizing virtual machines, currently known or to be developed in the future, with the implementations of the subject matter described herein.

In some implementations, the first machine 120A and the second machine 120B are mounted with video management system software that can communicate with each other, respectively. For example, the video management system software may include a recording module, a distributing module, and a replay module. The recording module is associated with a camera and can store real-time video streams obtained by the camera into the storage server 130. The distributing module can send the real-time video obtained by the camera to a real-time surveillance device, such as a television wall of a central control room. The replay module can retrieve the video stored in the storage server 130 to provide to the user in response to a user's replay request. A user may display the video on a client display, where the user may use the Internet to play the surveillance video remotely. The video management system software may further include other modules, such as a movement detecting module, a defogging module, an alarming module, and the like.

In some implementations, the video surveillance system 100 further includes a management server 140 for managing the video surveillance system 100. The management server 140 can exist independently from the storage server 130 or as a virtual machine in the storage server 130. As a non-limiting implementation, the management server 140 can monitor operating conditions of each virtual machine in the video surveillance system 100 and video management system software operating on each virtual machine. The management server 140 can inform an abnormal condition occurring in a virtual machine or video management system software to other virtual machines. Optionally, the management server 140 can be used to determine which of the other virtual machines to which the cameras hosted by the virtual machine or the video management system software under abnormal conditions should be migrated for hosting. Those skilled in the art shall appreciate that the management server 140 described herein can also be a certain software module or a hardware component in the video management system 100 that is inserted in other devices of the system.

When the second machine 120B has a failure, the second set of cameras 110B can be migrated to other machines so that video streams can be further transmitted and stored. When the second set of cameras 110B are to be migrated to the first machine 120A, it is possible that the first machine 120A may not be capable of supporting both the first set of cameras 110A and the second set of cameras 110B with original parameters. For instance, the first set of cameras 110A include 50 cameras using first video parameters, and the second set of cameras 110B include 50 cameras using the first video parameters, while the first machine 120A may not be capable of supporting these 100 cameras using the first video parameters at the same time. As to this problem, the subject matter described herein provides a method of achieving failover by negotiating video parameters utilized by a camera based on resource conditions and load conditions on the first machine 120A.

Figure 2:
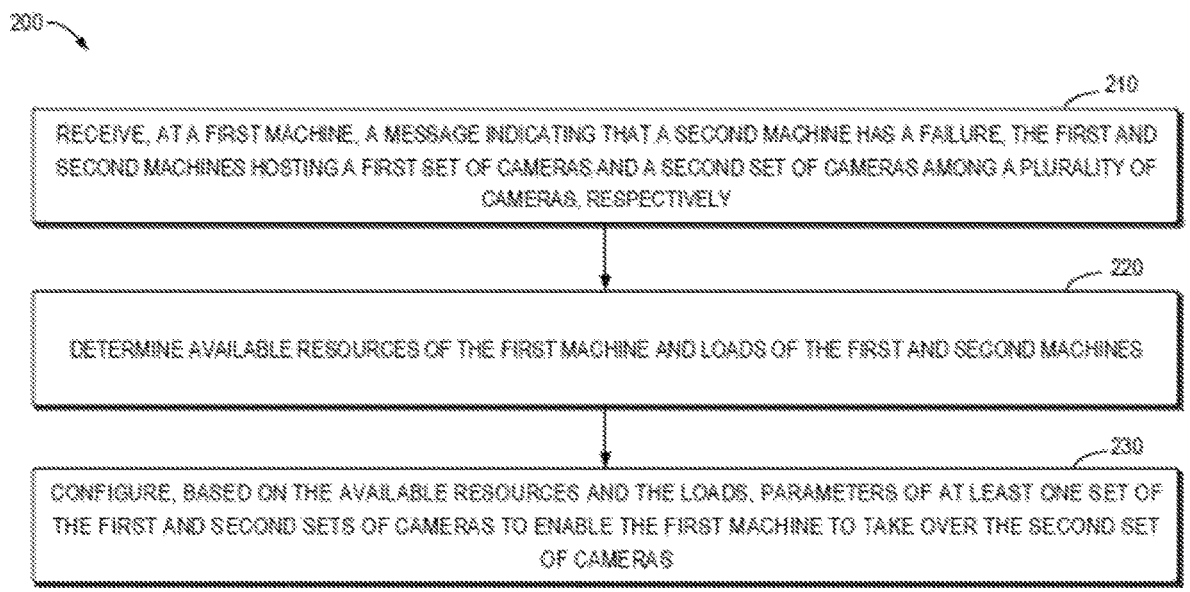
FIG. 2 is a flowchart illustrating a failover method in a video surveillance system according to an implementation of the subject matter described herein.

FIG. 2 is a flowchart illustrating a failover method 200 in the video surveillance system 100 according to an implementation of the subject matter described herein. In some implementations, the method 200 can be implemented by, for instance, the first machine 120A. It is to be understood that the method 200 may further include additional steps not shown and/or omit shown steps. The scope of the subject matter described herein is not limited in this respect.

At 210, a message indicating that the second machine 120B has a failure is received at the first machine 120A. The first machine 120A and the second machine 120B host the first set of cameras 110A and the second set of cameras 110B among a plurality of cameras, respectively. The indication can be sent by other components in the video management system 100 to the first machine 120A. The first machine 120A and the second machine 120B can also communicate with each other. The failure of the second machine 120B can be detected by the first machine 120A. The failure can be a software failure or a hardware failure and may be caused by network interruption or network congestion.

At 220, available resources of the first machine 120A and loads of the first machine 120A and the second machine 120B are determined. As a non-limiting implementation, the available resources may refer to reserved resources or backup resources, and the loads may refer to machine resources occupied by applications supported by the machine. In some implementations, determining available resources of the first machine 120A may include determining at least one of the following: a processor resource of the first machine 120A, a memory capacity of the first machine 120A, and network bandwidth of the first machine 120A. In some implementations, determining the loads includes: determining a first number of the first set of cameras 110A; and determining a second number of the second set of cameras 110B. The first set of cameras 110A can locally store a list recording the first number and the second number.

At 230, parameters of at least one set of the first set of cameras 110A and the second set of cameras 110B are configured based on the available resources and the loads, to enable the first machine 120A to take over the second set of cameras 110B. In some implementations, configuring parameters includes: in response to the available resources of the first machine 120A being insufficient to support the loads of the first machine 120A and the second machine 120B, reducing configuration of parameters based on the available resources.

In some implementations, reducing the configuration of parameters includes reducing a frame rate, for instance, reducing from 30 frames per second to 25 frames per second, or from 25 frames per second to 5 frames per second. Alternatively or additionally, at 230, the image resolution can be reduced from, for instance, 720×480 to 352×240, and so on. Apart from this or as an alternative, at 230, the video format can also be changed, for example, from a format occupying larger storage space to a format requiring smaller storage space and the like.

In some implementations, at least one of the first machine 120A and the second machine 120B is a virtual machine (VM). The virtual machine can be installed in the storage server 130 of the video management system 100. One of the benefits of installing the virtual machine in the storage server 130 is reducing the number of physical servers, thereby saving system costs. By installing the virtual machine in the storage server 130, it is possible not only to make full use of processor resources of the storage server 130 but also to avoid configuring too many video management system servers specifically for mounting the video system management software, thereby saving costs as well as ensuring coverage scope and reliability. In some implementations, the first machine 120A and the second machine 120B are equipped with video management system software that can communicate with each other, respectively. The video management system software can be installed in the virtual machine like being installed in a physical machine.

In some implementations, if the first machine 120A receives a message indicating that the failure has been eliminated from the second machine 120B, then the first machine 120A can hand over the second set of cameras 110B to the second machine 120B for hosting. In some implementations, during the handing over process, the second set of cameras 110B can receive a video parameter configuration message sent by the second machine 120B, and configure its own video parameters based on the video parameter configuration message. The second set of cameras 110B then transmit collected videos to the second machine 120B with the configured parameters.

In some implementations, the second machine 120B can determine video parameters of the second set of cameras 110B at least based on available resources and loads. This process is similar to determining available resources and loads implemented by the first machine 120A described above, thus omitted here. In some implementations, the first set of cameras 110A can receive a video parameter configuration message sent by the first machine 120A, configure its own video parameters based on the video parameter configuration message. The first set of cameras 110A then transmit collected videos to the first machine 120A with the configured parameters.

It is to be understood, in some implementations, the second set of cameras 110B may not be handed over to the second machine 120B for hosting after the failure of the second machine 120B has been fixed, and the first machine 120A may continue to host the second set of cameras 110B. Under this condition, parameters of the first set of cameras 110A and the second set of cameras 110B may not be reconfigured. Whether to hand over the second set of cameras 110B to the second machine 120B for hosting can be preconfigured in the system 100 or determined by a user after sending a notification to the user.

In some implementations, the first machine 120A is selected by a particular component in the video management system 100 for hosting the second set of cameras 110B. In some implementations, at least part of the second set of cameras 110B can be migrated to the first machine 110A and at least part of the second set of cameras 110B are migrated to a third machine in the video surveillance system 100. Before at least a part of cameras of the second set of cameras 110B are migrated to the third machine, available resources and loads can be determined similarly. The number of cameras distributed to the second machine 120B and the third machine can be designated by the system 100.

Figure 3:
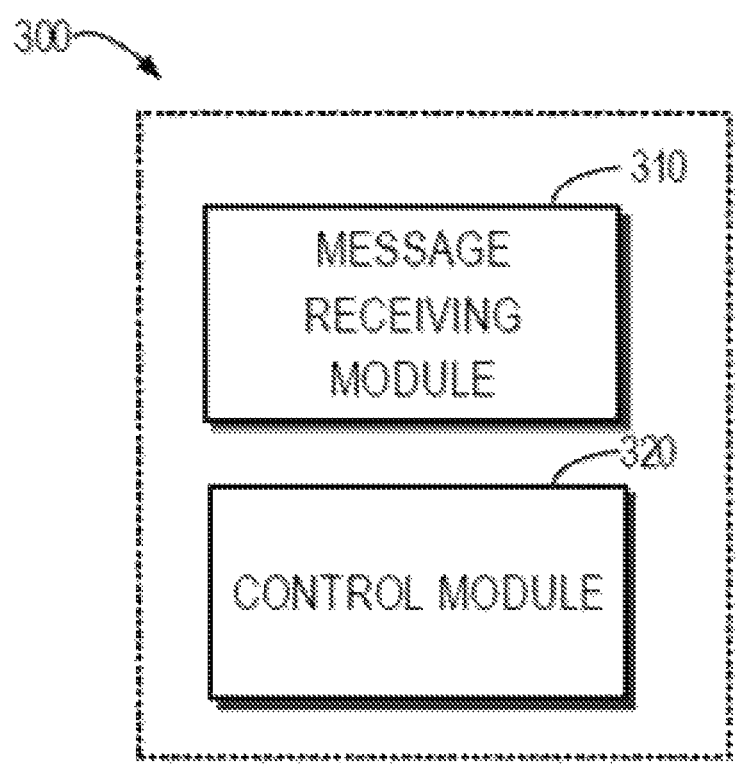
FIG. 3 is a block diagram illustrating a failover apparatus in a video surveillance system according to an implementation of the subject matter described herein.

FIG. 3 is a block diagram illustrating the failover apparatus 300 for a video surveillance system according to an implementation of the subject matter described herein. In some implementations, the apparatus 300 can be, for instance, implemented on the first machine 120A. The apparatus 300 includes a message receiving module 310 and a control module 320. It can be understood that the purpose of listing this block diagram is only to make it easier to understand the subject matter described herein, rather than limiting implementations of the subject matter described herein. The apparatus 300 may further include additional modules not shown and/or omit shown modules.

The message receiving module 310 is configured to receive, at the first machine 120A, a message indicating that the second machine 120B has a failure, the first machine 120A and the second machine 120B hosting a first set of cameras 110A and a second set of cameras 110B among a plurality of cameras, respectively. In some implementations, the control module 310 is further configured to receive a message indicating that the failure has been eliminated from the second machine; and to hand over the second set of cameras 110B to the second machine 120B for hosting.

The control module 320 is configured to: determine available resources of the first machine 120A and loads of the first machine 120A and the second machine 120B; based on the available resources and loads, configure parameters of at least one set of the first set of cameras 110A and the second set of cameras 110B, to enable the first machine 120A to take over the second set of cameras 110B.

For the sake of clarity, some optional modules of apparatus 300 are not shown in FIG. 3. However, it is to be understood that various features as described with reference to FIGS. 1 and 2 are likewise applicable to apparatus 300. Besides, various units in apparatus 300 may be hardware modules or software modules. For example, in some implementations, the apparatus 300 may be partially or completely implemented using software and/or firmware, e.g., implemented as a computer program product embodied on a computer readable medium. Alternatively or additionally, the apparatus 300 may be partially or completely implemented based on hardware, for example, implemented as an integrated circuit (IC) chip, an application specific integrated circuit (ASIC), a system on chip (SOC), a field programmable gate array (FPGA) and so on. The scope of the present disclosure is not limited in this aspect.

The subject matter described herein can be a method, a device, a system, and/or a computer program product. The computer program product may include a computer-readable storage medium which carries computer-readable program instructions to implement various aspects of the subject matter described herein.

The machine readable storage medium can be a tangible device keeping and storing instructions used by the instruction executing device. The machine-readable medium may include, but not limited to, electronic, magnetic, optical, electro-magnetic, semiconductor storage device or any suitable combination of the foregoing. More specific examples (non-exhaustive list) of the machine readable storage medium include: a portable computer disk, a hard disk, a random access memory (RAM), a read only memory (ROM), an erasable programmable read-only memory (EPROM or Flash memory), a static random access memory (SRAM), a portable compact disc read-only memory (CD-ROM), a digital versatile disc (DVD), a memory stick, a floppy disk, a mechanical encoding device, such as a punched card with instructions stored thereon or a groove in the convex structure, or any suitable combination of the foregoing. The machine readable storage medium used here is not to be interpreted as the instantaneous signal per se, such as radio wave or other electromagnetic waves that are propagated freely, electromagnetic waves propagated through waveguide or other transmission medium (e.g. optical pulse through optical fiber cable) or electrical signals transmitted over electrical lines.

The machine readable program instructions described here can be downloaded from the machine readable storage medium to the computing/processing devices, or to the external computers or external storage devices through network, such as Internet, local network, WAN and/or wireless network. The network may comprise copper transmission cable, optical fiber transmission, wireless transmission, router, firewall, switch, network gateway computer and/or edge server. The network adapter card or network interface in each computing/processing device receives machine readable program instructions from the network and forwards the machine readable program instructions for storage in the machine readable storage medium in each computing/processing device.

The computer program instructions for implementing operations of the subject matter described herein can be assembly instructions, instruction set architecture (ISA) instructions, machine instructions, machine related instructions, microcode, firmware instructions, status configuration data or source code or target code complied with one or any combination of multiple programming languages. The programming languages include object-oriented programming language-such as Smalltalk, C++ language and so on, and conventional processing programming language-such as "C" language or similar programming language. The machine readable program instructions can be wholly or partly executed on the user computer, executed as an independent software packet, partly executed on the user computer and partly executed on the remote computer, or wholly executed on the remote computer or server. In the case involving remote computer, the remote computer can be connected to the user computer via any kind of networks, including LAN or WAN, or can be connected to the exterior computer (e.g. connected via Internet with an Internet service provider). In some implementations, the electronic circuitry is customized with status information of machine readable program instructions, such as programmable logical circuitry, field programmable gate array (FPGA) or programmable logical array (PLA). The electronic circuitry can implement machine readable program instructions and thus implement aspects of the subject matter described herein.

Aspects of the subject matter described herein are illustrated with reference to the flowcharts and/or block diagrams of the method, apparatus (system) and computer program product in accordance with implementations of the subject matter described herein. It is to be understood that each block in the flow map and/or block diagram or combination of blocks in the flowchart and/or block diagram can be implemented by machine readable program instructions.

These machine readable program instructions can be provided to a universal computer, a dedicated computer or a processing unit of other programmable data processing apparatuses to generate a machine so that the instructions, when implemented by computer or other programmable data processing apparatuses, cause the function/operation specified by one or more blocks of the flowchart and/or block diagram to be implemented. These machine readable program instructions can also be stored in the computer readable storage medium and cause the computer, the programmable data processing apparatus and/or other devices to work in a specific manner so that the computer readable medium with instructions stored thereon includes a manufacturing product which contains instructions to implement function/action specified in one or more blocks in the flowchart and/or block diagram.

Machine readable program instructions can also be uploaded to the computer, other programmable data processing apparatuses, or other devices so that a series of operation procedures are executed in the computer, other programmable data processing apparatuses or other devices to generate a process implemented by computer so that instructions executed on the computer, other programmable data processing apparatuses or other devices implement function/action specified in one or more blocks in the flowchart and/or block diagram.

The flowchart and the block diagram in the drawings illustrate the architecture, function and operation that may be implemented with the system, method and computer program product in accordance with the implementations of the subject matter described herein. In this aspect, each block in the flowchart or block diagram may represent a module, a program segment, or a portion of instructions that comprise one or more executable instructions to implement the specified logical functions. In some alternative implementations, the functions marked in the blocks may also occur in an order different from that marked in the drawings. For example, two blocks shown successively can actually be implemented substantially in parallel or even be implemented in a reverse order depending on the function. It is also worth noting that each block in the flow diagram and/or block diagram and combination of the blocks in the flowchart and/or block diagram may be implemented with the function specified by the implementation or operation-dedicated hardware-based system or a combination of a dedicated hardware and computer instructions.

Various implementations of the subject matter described herein have been described above. The above description is only exemplar and not exhaustive and is not limited to the implementations of the subject matter described herein. Without departing from the scope and spirit of the various implementations described above, many modifications and variations are obvious for those ordinarily skilled in the art. The selection of terms in the text intends to explain principles of the implementations, practical application or technological improvement in market at best or to enable other ordinarily skilled in the art to understand implementations of the subject matter described herein.

We claim:

1. A method of failover in a video surveillance system, the video surveillance system including a plurality of cameras hosted by a plurality of machines, the method comprising:
   receiving, at a first machine, a message indicating that a second machine has a failure, the first and second machines hosting a first set of cameras and a second set of cameras among the plurality of cameras, respectively;
   determining available resources of the first machine and loads of the first and second machines; and
   configuring, based on the available resources and the loads, parameters of at least one set of the first and second sets of cameras to enable the first machine to take over the second set of cameras.

2. The method according to claim 1, further comprising:
   receiving, from the second machine, a message indicating that the failure has been eliminated; and
   handing over the second set of cameras to the second machine for hosting.

3. The method according to claim 1, wherein determining available resources of the first machine comprises determining at least one of the following:
   a processor resource of the first machine,
   a memory capacity of the first machine, and
   network bandwidth of the first machine.

4. The method according to claim 1, wherein determining the loads comprises:
   determining a first number of the first set of cameras; and
   determining a second number of the second set of cameras.

5. The method according to claim 1, wherein configuring the parameters comprises:
   in response to the available resources of the first machine being insufficient to support the loads of the first and second machines, reducing configuration of the parameters based on the available resources.

6. The method according to claim 5, wherein reducing the configuration of the parameters comprises at least one of the following:
   reducing an image resolution;
   reducing a frame rate; and
   changing a video format.

7. The method according to claim 1, wherein at least one of the first and second machines is a virtual machine.

8. An apparatus for failover in a video surveillance system, the video surveillance system including a plurality of cameras hosted by a plurality of machines, the apparatus comprising:
   a message receiving module configured to receive, at a first machine, a message indicating that the second machine has a failure, the first and second machines hosting a first set of cameras and a second set of cameras among the plurality of cameras, respectively;
   a control module configured to:
      determine available resources of the first machine and loads of the first and second machines;
      configure, based on the available resources and the loads, parameters of at least one set of the first and second sets of cameras to enable the first machine to take over the second set of cameras.

9. The apparatus according to claim 8, wherein the control module is further configured to:
   receive, from the second machine, a message indicating that the failure has been eliminated; and
   hand over the second set of cameras to the second machine for hosting.

10. The apparatus according to claim 8, wherein the control module is configured to determine at least one of the following:
    a processor resource of the first machine,
    a memory capacity of the first machine, and
    network bandwidth of the first machine.

11. The apparatus according to claim 8, wherein the control module is configured to determine the loads by:
    determining a first number of the first set of cameras; and
    determining a second number of the second set of cameras.

12. The apparatus according to claim 8, wherein the control module is configured to configure the parameters by:
    in response to the available resources of the first machine being insufficient to support the loads of the first and second machines, reducing configuration of the parameters based on the available resources.

13. The apparatus according to claim 8, wherein the control module is configured to reduce the configuration of the parameters by at least one of:
    reducing an image resolution;
    reducing a frame rate; and
    changing a video format.

14. The apparatus according to claim 8, wherein at least one of the first and second machines is a virtual machine.

15. The apparatus according to claim 8, wherein the video surveillance system further includes a storage server with at least one of the first and second machines installed therein.

16. The apparatus according to claim 8, wherein the
    first machine and the second machine have video management
    system software installed therein, respectively, for communication with each other, and
    wherein the video management system software includes a replay module, a recording module, and a distributing module.

17. The apparatus according to claim 8, wherein the video surveillance system further includes a management server for managing the video surveillance system.

18. A computer program product for failover in a video surveillance system, the video surveillance system including a plurality of cameras hosted by a plurality of machines, the computer program product comprising:
 a non-transitory computer readable medium encoded with computer-executable code, the code configured to enable the execution of:
  receiving, at a first machine, a message indicating that a second machine has a failure, the first and second machines hosting a first set of cameras and a second set of cameras among the plurality of cameras, respectively;
  determining available resources of the first machine and loads of the first and second machines; and
  configuring, based on the available resources and the loads, parameters of at least one set of the first and second sets of cameras to enable the first machine to take over hosting the second set of cameras.

19. The method according to claim 1, wherein configuring the parameters includes:
 sending a video parameter configuration message from the first machine to a particular camera that directs the particular camera to respond by transmitting video to the first machine with a reduced frame rate in accordance with the parameters.

20. The method according to claim 1, wherein receiving the message indicating that the second machine has the failure includes:
 acquiring the message from a management server that is different from the first and second machines, the management server monitoring operating conditions of the first and second machines and informing the first machine that an abnormal operating condition has occurred in the second machine.

* * * * *